United States Patent [19]

Sherwood

[11] 4,330,794
[45] May 18, 1982

[54] MULTICHANNEL SUBSCRIPTION TELEVISION SYSTEM

[75] Inventor: Robert A. Sherwood, El Paso, Tex.

[73] Assignee: GTE Automatic Electric Laboratories, Inc., Northlake, Ill.

[21] Appl. No.: 124,498

[22] Filed: Feb. 25, 1980

Related U.S. Application Data

[63] Continuation-in-part of Ser. No. 108,623, Dec. 31, 1979.

[51] Int. Cl.³ .............................................. H04N 7/16
[52] U.S. Cl. .................................... 358/120; 358/114
[58] Field of Search ......................... 358/120, 123, 114

[56] References Cited

U.S. PATENT DOCUMENTS

| | | | |
|---|---|---|---|
| 2,907,816 | 10/1959 | Weiss | 358/120 |
| 3,184,537 | 5/1965 | Court et al. | 358/120 |
| 3,201,511 | 8/1965 | Doundoulakis | 358/120 |
| 3,530,232 | 9/1970 | Reiter et al. | 358/120 |
| 3,885,089 | 5/1975 | Callais et al. | 358/122 |
| 3,886,302 | 5/1975 | Kosco | 358/114 |
| 4,024,575 | 5/1977 | Harney et al. | 358/118 |
| 4,145,717 | 3/1979 | Guif et al. | 358/120 |
| 4,215,366 | 7/1980 | Davidson | 358/124 |

Primary Examiner—S. C. Buczinski
Attorney, Agent, or Firm—Russell A. Cannon

[57] ABSTRACT

Sinusoidal timing reference signals, each of which is associated with a different suppressed-sync scrambled-priority television channel signal, frequency modulate associated carrier frequency signals for producing modulated carrier signals that are combined with a continuous wave (CW) sinusoidal carrier frequency signal. After low-pass filtering to block harmonic frequencies that may interfere with the video carriers of composite television signals, only the fundamentals of the CW and modulated carrier signals are combined with non-scrambled and/or scrambled composite television signals for transmission to subscriber's equipment. In a descrambler at a subscriber location, the CW carrier signal is mixed with the modulated carrier signals to produce frequency modulated IF signals containing timing information for associated priority television channel signals. Upon request of a subscriber, a particular IF signal is demodulated to reproduce a timing reference signal here that is operated on to produce timing pulses that are slightly wider than the pulse width of, and delayed in time with respect to, suppressed horizontal blanking pulses carrying synchronization pulses in the associated scrambled composite television signal. The timing pulses drive a switched attenuator or amplifier for restoring the level of suppressed horizontal synchronization and blanking pulses in the associated scrambled composite television signal, and thereby descramble it.

10 Claims, 3 Drawing Figures

MULTICHANNEL SUBSCRIPTION TELEVISION SYSTEM

RELATED APPLICATIONS

This is a continuation-in-part of application Ser. No. 108,623, filed Dec. 31, 1979.

BACKGROUND OF INVENTION

This invention relates to multichannel subscription television systems utilizing scrambled television signals for providing secure transmission of selected-priority programs to subscriber equipment, and more particularly to such systems in which timing reference signals are transmitted to subscriber receiver equipment for use in descrambling associated priority television channel signals having suppressed horizontal synchronization and blanking puses.

Subscription-type CATV systems are described in U.S. Pat. Nos. 2,907,816, Subscription Television System by P. H. Weiss, dated Oct. 6, 1959 and 3,201,511, Subscription Television System Having Keyed Generation of Sync Signals at the Receiver, by H. Doundoulakis, dated Aug. 17, 1965. Since all customers of a cable television company will not elect to subscribe to priority programs, it is necessary in pay-cable television systems to scramble priority channel television signals so that they will not produce a viewable picture on a television screen. Only after payment of a service charge and installation of descrambler equipment at a subscriber's facility is a viewable television picture obtained on a television receiver there for the restricted or pay television channels.

One method of scrambling a composite television signal in head-end transmission equipment is to attenuate horizontal synchronization and blanking pulses thereof prior to launching it on a distribution system that may comprise a coaxial cable network. An associated timing signal having a frequency and phase related to that of the suppressed horizontal sync (i.e., synchronization and blanking) pulses is also transmitted to subscriber equipment where it is used in a descrambler for restoring horizontal sync pulses to their proper amplitude and sequence positions in the composite television signal. In one known technique, timing pulses are amplitude modulated onto a high frequency carrier signal for transmission on a coaxial cable. This technique requires a relatively wide frequency bandwidth for transmission that faithfully reproduces the rise and fall times of the square wave timing pulses in the receiver. In a system that uses microwave relays, for example, the wide bandwidth requirement necessitates dedication of a separate television type RF transmission channel for each timing signal. This is costly, especially in systems where signals are scrambled for a plurality of television channels that require separate timing information channels. Also, wide-band signals are difficult to detect in the presence of noise. In another technique employing a sinusoidal timing signal, a continuous wave audio signal is transmitted over a dedicated channel such as a telephone line. In yet another technique, a sinusoidal timing signal is amplitude modulated on a carrier signal for transmission. The amplitude modulated carrier signal is combined with the local oscillator signal that is generated in a subscriber's television receiver for reproducing a sinusoidal timing signal that is used in company-owned equipment there for descrambling the television signal. It is not desirable for a CATV operating company to utilize or modify a subscriber's television receiver, other than to connect an external cable to it, since this may subject the company to liability if a subscriber is injured when touching his television set or when the latter becomes defective. Also, to require a separate local oscillator, such as a temperature stable crystal oscillator, in each subscriber's location is costly.

An object of this invention is the provision of improved timing circuitry in a subscription television system.

SUMMARY OF INVENTION

In accordance with this invention, a multichannel television system utilizing suppression of horizontal synchronization and horizontal blanking pulses for scrambling one composite television signal for an associated one of a plurality of television channels in the system includes apparatus providing a timing signal in receiver equipment at a subscriber facility for use in descrambling the scrambled television signal for the one television channel, said apparatus comprising: a head-end transmitter generating a first sinusoidal carrier frequency signal and frequency modulating a second carrier frequency signal with a timing reference signal having a frequency, phase, and prescribed delay that are related to suppressed synchronization pulses in the scrambled television signal; means for combining non-scrambled and/or scrambled television signals with only the fundamental frequency components of the first and modulated carrier signals into a combination signal for transmission to receiver equipment at a subscriber location; and descrambler means for use at the subscriber location comprising means responsive to the combination signal for mixing the first carrier signal therein with the frequency modulated carrier signal therein for producing a frequency modulated IF signal, and means for demodulating the IF signal for reproducing the timing reference signal.

DESCRIPTION OF DRAWINGS

This invention will be more fully understood from the following detailed description of preferred embodiments thereof, together with the drawings in which.

DESCRIPTION OF PREFERRED EMBODIMENTS

Figure 1:
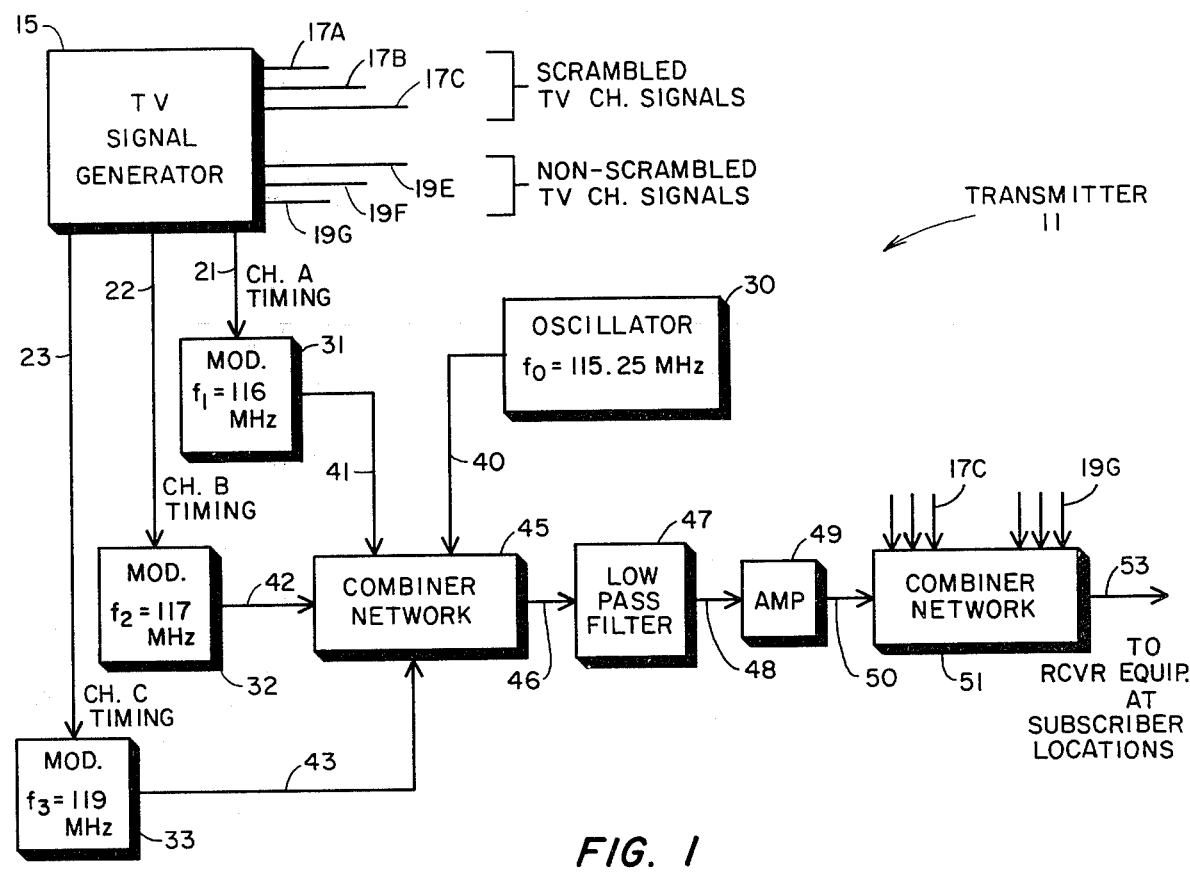
FIG. 1 is a schematic block diagram of head-end transmission equipment.

Referring now to FIG. 1, a transmitter 11 at the head-end of a secure subscriber television system embodying this invention comprises a signal generator 15 producing a plurality of scrambled and non-scrambled television channel signals on lines 17 and 19, and timing reference signals on lines 21–23 for associated scrambled-priority television channel signals; an oscillator 30 producing a continuous wave (CW) carrier signal on line 40; modulators 31–33 that are responsive to associated timing signals for producing modulated carrier signals on lines 41–43; a network 45 for combining the signals on lines 40–43; a low-pass filter 47; and a network 51 for combining the filtered signal with the scrambled and non-scrambled television signals for transmission to receiver equipment at subscriber locations. The television signal generator 15 is conventional and operates to produce non-scrambled television signals, as well as scrambled television signals with suppressed horizontal synchronization and horizontal blanking pulses. These signals modulate associated RF carrier signals to produce scrambled composite television signals (which include video carriers) for priority channels A, B and C on lines 17A, 17B and 17C, and non-scrambled composite television signals for channels E, F and G on lines 19E, 19F and 19G. Each composite television signal occupies an associated 6 MHz channel bandwidth in the television broadcast spectrum, in accordance with FCC regulations. The generator 15 also produces sinusoidal timing reference signals on lines 21–23 that are associated with the scrambled composite television signals for channels A, B and C. These timing signals have a frequency of 15.75 kHz, which is equal to that of horizontal synchronization pulses in television channel signals. The generator 15 normally causes zero crossings of these timing signals to be different, however, to compensate for time delays in circuitry passing the associated television signals. Also, the time delays introduced into these timing signals by generator 15 cause zero crossings thereof in one direction to occur slightly prior to initiation of suppressed horizontal blanking pulses in the scrambled television signals in receiver equipment.

The circuits 31–33 generate sinusoidal carrier signals of RF frequencies f1, f2 and f3 that are preferably frequency modulated with the sinusoidal timing signals for associated priority channels A, B and C. Zero crossings of the frequency modulated signals on lines 41–43 carry the necessary timing information for descrambling the composite television signals for priority channels A, B and C, respectively. The oscillator 30 produces a CW sinusoidal carrier signal on line 40 having an RF frequency. This signal is used as a local oscillator signal in receiver equipment at a subscriber location for reproducing a timing reference signal there, as is described more fully hereinafter. The use of frequency modulation for transmitting the timing signals provides suppression of interfering signals. The use of sinusoidal timing signals for modulating RF carrier signals at the horizontal scan rate reduces the bandwidth required for satisfactory transmission thereof that enables faithful reproduction of the timing signals in receiver equipment. It also makes it possible to use active filters to minimize adjacent channel interference and enhance the signal to noise ratio of the detected timing signal in receiver equipment. And by careful selection of the carrier frequencies of circuits 31–33, the use of sinusoidal frequency modulation of carrier signals makes it possible to transmit all of the RF signals from circuits 30–33 in a single synchronizatin or timing information channel having a 6 MHz bandwidth in the television broadcast spectrum.

The frequency fo of oscillator 30 is typically located 1.25 MHz above the lower edge of a synchronization timing information channel in the television broadcast spectrum that is designated to contain the local oscillator and timing signals. The spacing between carrier frequencies fo, f1, f2 and f3 are selected so that they are not multiples of each other in order to minimize beat frequencies that are produced in a mixer, and so that difference frequencies therebetween are not the same values. By way of example, the carrier signals may have frequencies fo=115.25 MHz, f1=116 MHz, f2=117 MHz, and f3=119 MHz. Consideration of the CW carrier signal and the frequency modulated carrier signals reveals that the contents of the synchronization timing information channel and a television channel containing a composite television signal are similar, where the CW carrier signal of frequency fo is analogous to a video carrier signal and the frequency modulated carrier signals are analogous to sound and/or color carrier signals. This means that inexpensive commercially available solid state integrated circuits that were developed for and are used in conventional television sets may be used extensively in descramblers at subscriber locations. This greatly reduces the cost of CATV company-owned receiver equipment that must be installed at a subscriber's location.

The CW and modulated carrier signals on lines 40–43 are combined in a network 45 that may be a four-way combiner. It is desirable that harmonics of the carrier frequencies fo–f3 in the combination signal on line 46 not be introduced into the output signal of the transmitter since they may interfere with composite television signals there. This is particularly true where the frequencies of harmonics are substantially the same as frequencies of video carriers in composite television signals. Transmission of such harmonic signals could cause degradation of a resultant television picture appearing on a subscriber's television set. In accordance with this invention, the combination signal on line 46 is passed to a low-pass filter 47 which may be an LC Chebychev filter having a frequency response for passing only the fundamentals of the carrier frequencies fo–f3 and any timing information modulated thereon. Since the lowest and highest carrier frequencies in the previous example are 115.25 MHz and 119 MHz, the filter 47 typically has an upper cutoff frequency such as 120 MHz and a roll-off that makes the filter response at least 40 dB down for frequencies greater than 230.5 MHz, which is the second harmonic of the lowest frequency fo produced by circuits 30–33. Thus, the filter 47 passes the CW and modulated carrier frequencies fo–f3 to line 48 and essentially blocks harmonics of these frequencies. The filtered signal is amplified and combined with the scrambled and non-scrambled composite television signals on lines 17 and 19 in a network 51 that stacks the RF signals in the television broadcast spectrum for transmission on a coaxial cable 53, for example, to remote subscriber viewing locations. The networks 45 and 51 may comprise combinations of commercially available power divider/combiner networks.

Figure 2:
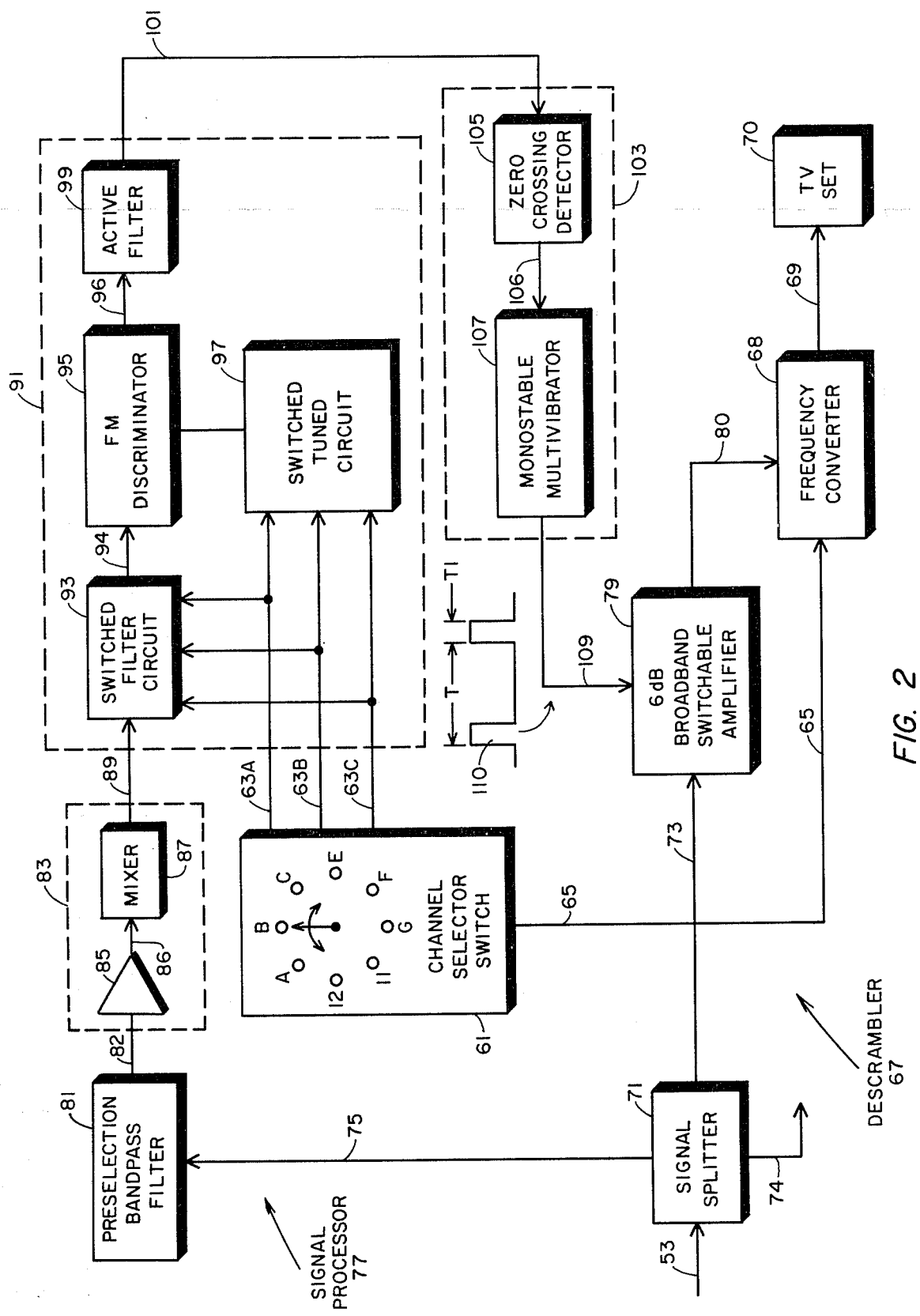
FIG. 2 is a schematic block diagram of receiver equipment at a subscriber location for selectively descrambling a scrambled composite television signal.

Subscription television receiving equipment in FIG. 2 is located at a subscriber facility that is spaced from the head-end eqipment. It essentially comprises a television receiver 70 and a CATV converter including a channel selector switch 61, a descrambler circuit 67, and a frequency converter circuit 68. It will be assumed hereinafter, for simplicity of illustration, that switch 61 is turned to the position shown in FIG. 2 for selecting the priority channel B for viewing. The circuit 68 is responsive to a control signal on line 65 from the switch 61 for converting a selected one of the descrambled and non-scrambled composite television channel signals on line 80 to a prescribed frequency band in the television broadcast spectrum for application on line 69 to the television set 70 and viewing by a subscriber. The descrambler 67 generally comprises a signal splitter 71, signal processor 77 and broadband switchable amplifier 79. The signal splitter 71 couples the transmitted composite television signals onto line 73 and a portion thereof onto line 75. As explained in detail below, the signal processor 77 selectively extracts a particular timing signal for an associated priority channel program from the received RF signals and converts it to a train of timing pulses on line 109. The amplifier 79 is responsive to the timing pulses for selectively changing the gain thereof for increasing the level of only horizontal synchronization and blanking pulses in a composite television signal on line 73 to a prescribed level.

The processor 77 comprises a pre-selection bandpass filter 81; non-linear circuit means 83; tunable frequency discriminator means 91; and pulse forming means 103. The filter 81 is designed to pick out only that portion of the television broadcast spectrum containing the synchronization information channel frequencies and passing it to circuit 83 for amplification by an amplifier 85. The amplified CW and modulated carrier signals on line 86 are all applied to the same input terminal to a mixer 87 that is a nonlinear circuit element. Since the frequency of the carrier signals on line 86 are in the television broadcast spectrum, the amplifier 85 may be an MPS-H10 transistor with associated circuitry and the mixer 87 a commercially available MPS-H24 transistor Q1 with collector feedback biasing (See FIG. 3). All of the carrier signals are AC coupled to the Q1 base electrode. The CW carrier signal operates as a local oscillator signal here in producing sum and difference frequency signals at the Q1 collector electrode, on output line 89. The fundamental difference frequencies of interest on line 89 are $\Delta f_A = 0.75$ MHz, $\Delta f_B = 1.75$ MHz, and $\Delta f_C = 3.75$ MHz.

Figure 3:
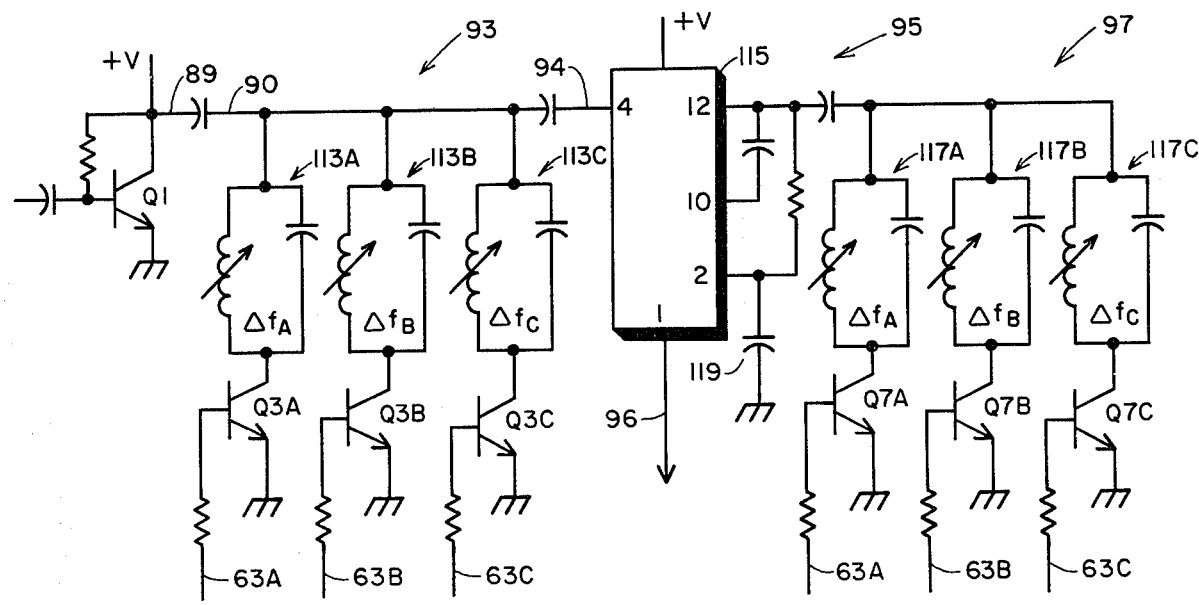
FIG. 3 is a schematic circuit diagram for the mixer 87 and frequency discriminator means 91 of FIG. 2.

The circuit means 91 generally comprises a switchable filter circuit 93 and an FM discriminator 95 having an external switchable tuned circuit 97 associated therewith, as is shown in more detail in FIG. 3. The circuit 93 comprises a plurality of parallel-tuned circuits 113A, 113B, and 113C, each of which is tuned to an associated one fo the fundamental difference frequencies $\Delta f_A$, $\Delta f_B$, and $\Delta f_C$. The circuits 113 are selectively electrically connected, one at a time, to ground through an associated control transistor Q3 in response to a control signal from selector switch 61 on a line 63. A positive control voltage on line 63B, for example, cause Q3B to conduct in saturation to connect tuned circuit 113B to ground to bypass signals on line 90 having frequencies other than $\Delta f_B$ to ground and away from the discriminator 95.

The frequency discriminator circuit 95 is essentially an Mc-1357 integrated circuit chip 115 having pins thereof connected to external elements, ground and a positive supply voltage in the conventional manner. The IF input signal on line 90 is AC coupled to pin 4. The circuit 97 is similar to the filter circuit 93 and comprises parallel tuned circuits 117A, 117B and 117C that are resonant at associated fundamental difference frequencies $\Delta f_A$, $\Delta f_B$ and $\Delta f_C$ and operative for establishing the operating frequency of the discriminator. Each tuned circuit 117 has one side thereof for electrical connection to ground through an associated control transistor Q7 when the latter conducts in response to a control signal on a line 63. The other sides of the tuned circuits 117 are AC coupled to pins 10 and 12 of the MC 1357 chip 115. Since the capacitor 119 converts pin 2 to an AC ground point, conduction of the transistor Q7B, for example, connects tuned circuit 117B across pins 2 and 10 (12) of the chip for determining the operating frequency of the discriminator. This causes the discriminator chip 115 to detect the desired IF signal of frequency $\Delta f_B = 1.75$ MHz in this example and output a 15.75 KHz sinusoidal timing signal associated with priority channel B on line 96. This timing signal is shaped by a low pass active filter 99 to enhance its signal to noise ratio.

Since zero crossings in the timing signal on line 101 occur just prior to initiation of the leading edge of horizontal blanking pulses in the composite television signal on line 73, for priority channel B in this example, the timing signal is applied to a zero crossing detector 105. This detector 105 may be a MC14069 CMOS hex-inverter type of integrated circuit. Each stage of the hex-inverter amplifies and limits the timing signal further for converting it to a square wave signal with sharp transitions occurring at zero crossings of the timing signal. The output of detector 105 on line 106 is a train of symmetrical pulses with rising edges, for example, occurring immediately prior to invitation of suppressed horizontal blanking pulses in the composite television signal for channel B. This square wave pulse signal on line 106 is buffered into a monostable multivibrator 107, which may be a TTL 74121 integrated circuit. The rising edges of pulses on line 106 trigger the monostable multivibrator 107 for producing a train of pulses 110 on line 109 having a width T1 that is somewhat longer than the width of the suppressed horizontal blanking pulses in the composite television signal on line 73 for channel B.

The amplifier 79 normally has a prescribed gain or amplification when a pulse signal 110 is absent from line 109. The circuit 79 is operative only during the time interval T1 that a pulse 100 is present on line 109 for increasing the gain thereof a prescribed amount, such as 6 dB, for selectively amplifying the RF signal on line 73. This operation of circuit 79 increases the amplitude of suppressed horizontal blanking pulses and associated synchronization pulses in the composite television signal for priority channel B so that they are the proper level for utilization in the TV set 70. The RF signal on line 80 includes a descrambled composite television signal for channel B that is translated to a prescribed television channel position by circuit 68 prior to application to the television receiver 70 for viewing.

Although this invention is described in relation to preferred embodiments thereof, variations and modifications will occur to those skilled in the art without departing from the scope of this invention. By way of example, the circuits 31-33 may amplitude modulate or phase modulate a carrier frequency signal with a timing signal. And, the timing signals from generator 15 may be square wave or pulse signals having a transition whenever a horizontal synchronization pulse is initiated, although this may require a portion of the television broadcast spectrum that is greater than 6 MHz. Also, the synchronization information channel signal on line 82 may be applied to a pair of filters, one passing only the CW carrier signal of frequency fo and the other passing the frequency modulated carrier signals. The outputs of these filters are then applied to a pair of terminals of an RF mixer for producing frequency modulated IF sum and difference frequencies for processing by a discriminator means 91. Further, the switch 61 may be responsive to a control signal from head-end equipment for selecting which, if any priority channel signal is to be descrambled. In such a system, the subscriber normally must give prior notice to the CATV office as to which priority programs he wishes to view. Also, filters of appropriate passbands may be located in lines 73 and 74 for passing only the scrambled and non-scrambled composite television channel signals to circuits 79 and 68, respectively. In this manner, the operation of circuit 79 in descrambling a television signal does not impair the character of nonscrambled television signals. Further, the descrambler does not have to operate on television signals having frequencies in the television broadcast spectrum. Also, the desired delay may be introduced into a reproduced timing reference signal from detector 105 rather than by the signal generator 15. And, the desired filtering may be obtained by operating directly on the output signals of the modulators 31–33, although this implementation will require a plurality of low pass filters 47. Or the desired filtering can be obtained using a bandpass filter that passes all frequencies of interest while attenuating the harmonics. The scope of this invention is therefore defined by the appended claims rather than the aforementioned detailed descriptions of embodiments thereof.

I claim:

1. In a multi-channel television system utilizing suppression of horizontal synchronization and associated horizontal blanking pulses for scrambling a plurality of composite television channel signals for associated ones of a plurality of television channels in the system, apparatus for providing a timing signal in receiver equipment for a subscriber location for use in descrambling a selected scrambled composite television signal, comprising:

transmitter means comprising first means generating a first continuous wave sinusoidal carrier frequency signal having a frequency fo; second means generating a plurality of sinusoidal timing reference signals for associated scrambled television signals, each timing reference signal having a different phase (defined by zero crossings thereof) related to that of, and delayed in time with respect to, suppressed synchronization pulses in the associated scrambled television signal; third means frequency modulating associated ones of a plurality of second continuous wave sinusoidal carrier frequency signals with associated sinusoidal timing reference signals for providing associated modulated carrier signals, at least some of said second carrier signals having different frequencies that are spaced apart in a particular band in the frequency spectrum; and fourth means being repsonsive to the first and modulated-second carrier signals for combining only the fundamental frequency of the first carrier signal, only the modulated-fundamental frequencies of the second carrier signals, the associated scrambled television signals, and composite television signals for other channels into a first combination signal; and receiver means of the receiver equipment for receiving the first combination signal produced by said fourth means, and comprising fifth means for selecting a particular scrambled television channel for viewing and producing a control signal associated with and identifying the selected channel; sixth means for mixing said first carrier signal in the first combination signal with the modulated carrier signal for the selected channel signal in the first combination signal for producing an intermediate frequency (IF) signal for the selected channel modulated with the associated timing reference signal; seventh means responsive to said control signal for demodulating the modulated IF signal associated with the selected television channel for reproducing an associated sinusoidal timing reference signal carrying timing information in zero crossings thereof about timing of suppressed synchronization pulses in the associated television signal.

2. Apparatus according to claim 1 wherein said first and third means produce output carrier frequency signals having frequencies outside the frequency band of the associated scrambled television channels, at least some of said output carrier frequency signals from said first and third means being spaced apart so as to be located in a band corresponding to that of a commercial composite television channel.

3. Apparatus according to claim 2 wherein the carrier frequencies of output signals from said first and third means are non-multiples of each other and have difference frequencies therebetween that are unequal.

4. Apparatus according to claim 2 wherein said receiver means further comprises eighth means detecting zero crossings in the associated reproduced sinusoidal timing reference signal and converting the latter into a train of timing pulses having substantially the same frequency and phase as synchronization pulses, having a width somewhat greater than the pulse width of suppressed horizontal blanking pulses, and being delayed in time with respect to horizontal blanking pulses in the associated scrambled television signal in the receiver equipment.

5. Apparatus according to claim 4 including ninth means for adjusting the relative amplitude of the selected scrambled television signal in the receiver equipment during each timing pulse for reinserting synchronization pulses in the selected channel's television signal.

6. Apparatus according to claim 5 wherein the video carrier frequencies of at least some composite television signals are greater than the frequencies of the first and second carrier signals, said fourth means comprising tenth means for combining the first carrier signal and the modulated carrier frequency signals (carrying timing reference signals for associated scrambled television signals) for producing a second combination signal; filter means passing only the fundamentals of carrier frequencies in the second combination signal; and eleventh means for combining the second combination signal with the composite television signals for producing the first combination signal.

7. Apparatus according to claim 6 wherein said sixth means is a non-linear mixing means having the first carrier signal and modulated carrier signals in the first combination signal applied to the same input terminal thereof.

8. Apparatus according to claim 7 wherein said seventh means comprises a plurality of intermediate frequency filter means each responsive to a different associated control signal from said fifth means for passing a different associated frequency modulated IF signal as an output signal thereof.

9. Apparatus according to claim 8 wherein said seventh means further comprises tuned frequency modulation discriminator means including a plurality of tuned circuit means, each of which is selectively responsive to a different control signal from said fifth means for establishing the frequency of a frequency modulated IF input signal from one of said IF filter means that is detected thereby for reproducing an associated sinusoidal timing reference signal.

10. Apparatus according to claim 9 wherein said eighth means comprises detector means responsive to a reproduced sinusoidal timing reference signal from said discriminator means for detecting zero crossings thereof carrying timing information about synchronization pulses, and a monostable multivibrator circuit means responsive to the operation of said detector means for producing for alternate zero crossings of the reproduced sinusoidal timing signal an output timing pulse of a prescribed width that is slightly greater than the widths of horizontal blanking pulses in the selected scrambled television signal.

* * * * *